(12) United States Patent
Honda et al.

(10) Patent No.: US 9,493,065 B2
(45) Date of Patent: Nov. 15, 2016

(54) CONNECTOR FOR FUEL TANK

(75) Inventors: Itsuo Honda, Fujisawa (JP); Shunpei Nabeya, Sagamihara (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 508 days.

(21) Appl. No.: 14/009,642

(22) PCT Filed: Apr. 3, 2012

(86) PCT No.: PCT/JP2012/059070
§ 371 (c)(1),
(2), (4) Date: Dec. 10, 2013

(87) PCT Pub. No.: WO2012/137774
PCT Pub. Date: Oct. 11, 2012

(65) Prior Publication Data
US 2014/0091567 A1     Apr. 3, 2014

(30) Foreign Application Priority Data

Apr. 4, 2011 (JP) ................................. 2011-082530

(51) Int. Cl.
*B60K 15/035*     (2006.01)
*F02M 37/00*     (2006.01)
(Continued)

(52) U.S. Cl.
CPC ........ *B60K 15/035* (2013.01); *F02M 37/0076* (2013.01); *F16K 24/044* (2013.01); *F16K 33/00* (2013.01); *B60K 15/03519* (2013.01)

(58) Field of Classification Search
CPC .......... B60K 15/035; B60K 15/03519; F16K 33/00; F16K 24/04; F16K 24/042; F16K 24/044; F16K 24/046; F16K 24/048; F02M 37/0076

USPC ......... 137/202, 43, 561 A; 285/179; 138/40, 138/42
See application file for complete search history.

(56) References Cited

U.S. PATENT DOCUMENTS 3,388,714 A     6/1968   Rau
5,666,989 A  *  9/1997   Roetker .......... B60K 15/03519
                                                    137/202
5,694,968 A  * 12/1997   Devall ............ B60K 15/03519
                                                    137/202
(Continued)

FOREIGN PATENT DOCUMENTS

JP     H08-105571 A     4/1996
JP     H08-276756 A    10/1996
(Continued)

OTHER PUBLICATIONS

Japan Patent Office, "Office Action for JP 2011-082530," May 12, 2015.

*Primary Examiner* — Brian Glessner
*Assistant Examiner* — Adam Barlow
(74) *Attorney, Agent, or Firm* — Manabu Kanesaka

(57) ABSTRACT

A connector attached to a fuel tank for connecting a ventilation flow passage thereof to the fuel tank is provided. The connector includes an upper chamber provided with a first communication portion relative to the ventilation flow passage; and a lower chamber provided with a second communication portion relative to the fuel tank, and a third communication portion relative to the upper chamber. A mortar-shaped portion narrowing toward a lower side is formed in a bottom portion of the upper chamber. The third communication portion is formed in a bottom of the mortar-shaped portion, and recesses and protrusions are formed in a wall face of the mortar-shaped portion.

10 Claims, 4 Drawing Sheets

(51) Int. Cl.
*F16K 33/00* (2006.01)
*F16K 24/04* (2006.01)

(56) References Cited

U.S. PATENT DOCUMENTS

| | | | | |
|---|---|---|---|---|
| 6,408,867 | B2* | 6/2002 | Aoki | 137/202 |
| 6,843,268 | B2* | 1/2005 | Yamada | F16K 24/042 |
| | | | | 137/202 |
| 6,854,477 | B2 | 2/2005 | Yamada et al. | |
| 6,959,720 | B2* | 11/2005 | Kurihara | B60K 15/03519 |
| | | | | 137/202 |
| 7,247,036 | B2* | 7/2007 | Quintman | B29C 45/1657 |
| | | | | 439/34 |
| 2003/0111111 | A1* | 6/2003 | Zorine | F16K 24/044 |
| | | | | 137/202 |
| 2004/0003844 | A1* | 1/2004 | Yamada | B60K 15/03519 |
| | | | | 137/202 |
| 2006/0213553 | A1* | 9/2006 | Mills | B60K 15/03519 |
| | | | | 137/43 |
| 2010/0319787 | A1 | 12/2010 | Hirata | |

FOREIGN PATENT DOCUMENTS

| | | |
|---|---|---|
| JP | 2000-345933 A | 12/2000 |
| JP | 2006-097538 A | 4/2006 |
| JP | 3953916 B2 | 8/2007 |
| JP | 2010-105469 A | 5/2010 |
| JP | 2010-143498 A | 7/2010 |

* cited by examiner

CONNECTOR FOR FUEL TANK

RELATED APPLICATIONS

The present application is National Phase of International Application No. PCT/JP2012/059070 filed Apr. 3, 2012 and claims priority from Japanese Application No. 2011-082530, filed Apr. 4, 2011.

FIELD OF TECHNOLOGY

The present invention relates to an improvement of a connector attached to a fuel tank for an automobile, a two-wheeled automobile, or the like, and used for connecting a ventilation flow passage of the fuel tank to the fuel tank.

BACKGROUND ART

In a fuel shutoff valve attached to the fuel tank, there is a fuel shutoff valve wherein an opening allowing a downward space, in which a fuel proceeds, and an upward space, which is communicated with the ventilation flow passage, to be communicated, is surrounded by a wall around the opening so as to prevent the fuel in a liquid state from entering into the ventilation flow passage. (See Patent Document 1) However, in such a fuel shutoff valve, the aforementioned opening is just simply surrounded by the wall, and no special attention is given for returning the fuel, which happened to enter into the upward space, to the downward space.

PRIOR ART DOCUMENTS

Patent Documents

Patent Document 1: Japanese Unexamined Patent Application Publication No. 2011-000927

DISCLOSURE OF THE INVENTION

Problems to be Solved by the Invention

A main object to be obtained by the present invention is to effectively prevent an inflow of the fuel into the ventilation flow passage in this kind of connector.

Means for Solving the Problems

In order to obtain the aforementioned object, the present invention is a connector for a fuel tank attached to the fuel tank for connecting a ventilation flow passage thereof to the fuel tank. The connector for the fuel tank includes an upper chamber provided with a first communication portion relative to the ventilation flow passage; and a lower chamber provided with a second communication portion relative to the fuel tank, and a third communication portion relative to the upper chamber. Also, a mortar-shaped portion narrowing toward a lower side is formed in a bottom portion of the upper chamber, and the third communication portion is formed in a bottom of the mortar-shaped portion. Also, in a wall face of the mortar-shaped portion, there are formed recesses and protrusions.

According to such configuration, even in a case wherein a fuel happens to enter into the upper chamber through the third communication portion, while preventing the fuel entered in such manner from moving to a first communication portion side by the aforementioned recesses and protrusions, the fuel is guided to a lower chamber side through the third communication portion by inclination of the mortar-shaped portion so as to prevent the fuel entered in such manner from entering into the ventilation flow passage. Typically, at a fueling time, a vehicle inclination time, and the like, when the fuel enters into the lower chamber, the fuel blown into the upper chamber together with a gas flowing into the upper chamber through the third communication portion can be prevented from entering into the ventilation flow passage.

One of preferred aspects is to form the aforementioned recesses and protrusions by a plurality of grooves formed in the aforementioned mortar-shaped portion. In that case, furthermore, one of preferred aspects is to form such grooves in a range between an upper end of the mortar-shaped portion and the third communication portion. In that case, by the grooves, the fuel entered into the upper chamber as mentioned above can be appropriately guided to the lower chamber through the third communication portion.

Also, if a cover body which covers the third communication portion is supported directly above the third communication portion in the upper chamber, the fuel blown into the upper chamber as mentioned above is blocked, so that the fuel can be reliably kept in a formation range of the mortar-shaped portion.

Also, the first communication portion is formed in a lateral portion of the upper chamber, and at least one portion thereof is positioned below the upper end of the mortar-shaped portion. Moreover, in a portion facing the first communication portion in the mortar-shaped portion, there is occasionally formed a concave portion concaved toward an inside of the mortar-shaped portion and notching one portion of the mortar-shaped portion. In such case, even though the first communication portion is set at a level mentioned above, the gas inside the fuel tank can smoothly move to the ventilation flow passage through the first communication portion.

Effect of the Invention

According to the present invention, by the inclination and the recesses and protrusions of the aforementioned mortar-shaped portion, the fuel entered into the upper chamber can be effectively prevented from flowing into the ventilation flow passage.

BEST MODES OF CARRYING OUT THE INVENTION

Figure 1:
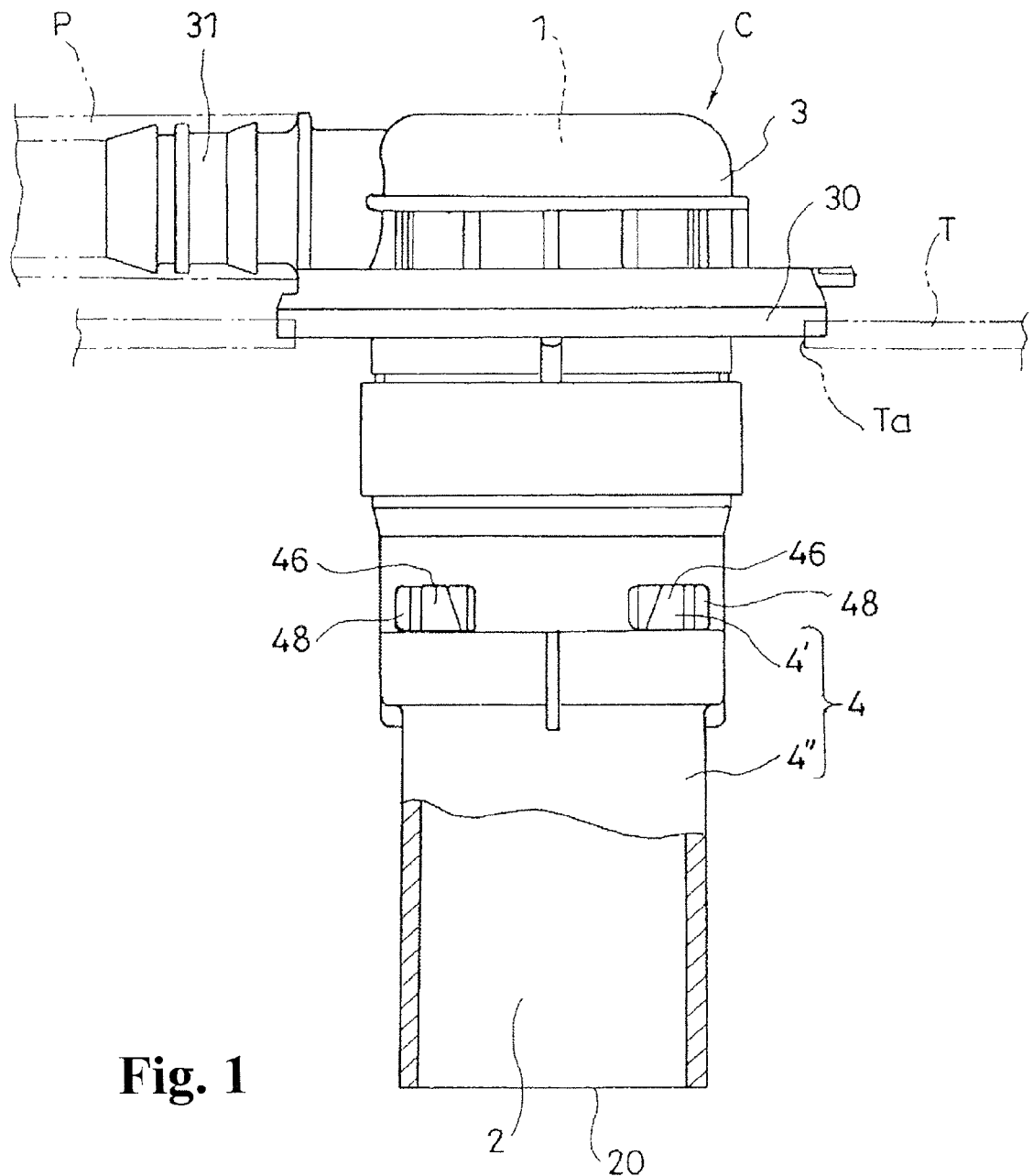
FIG. 1 is a side view showing a usage state of a connector according to an embodiment of the present invention.
Figure 2:
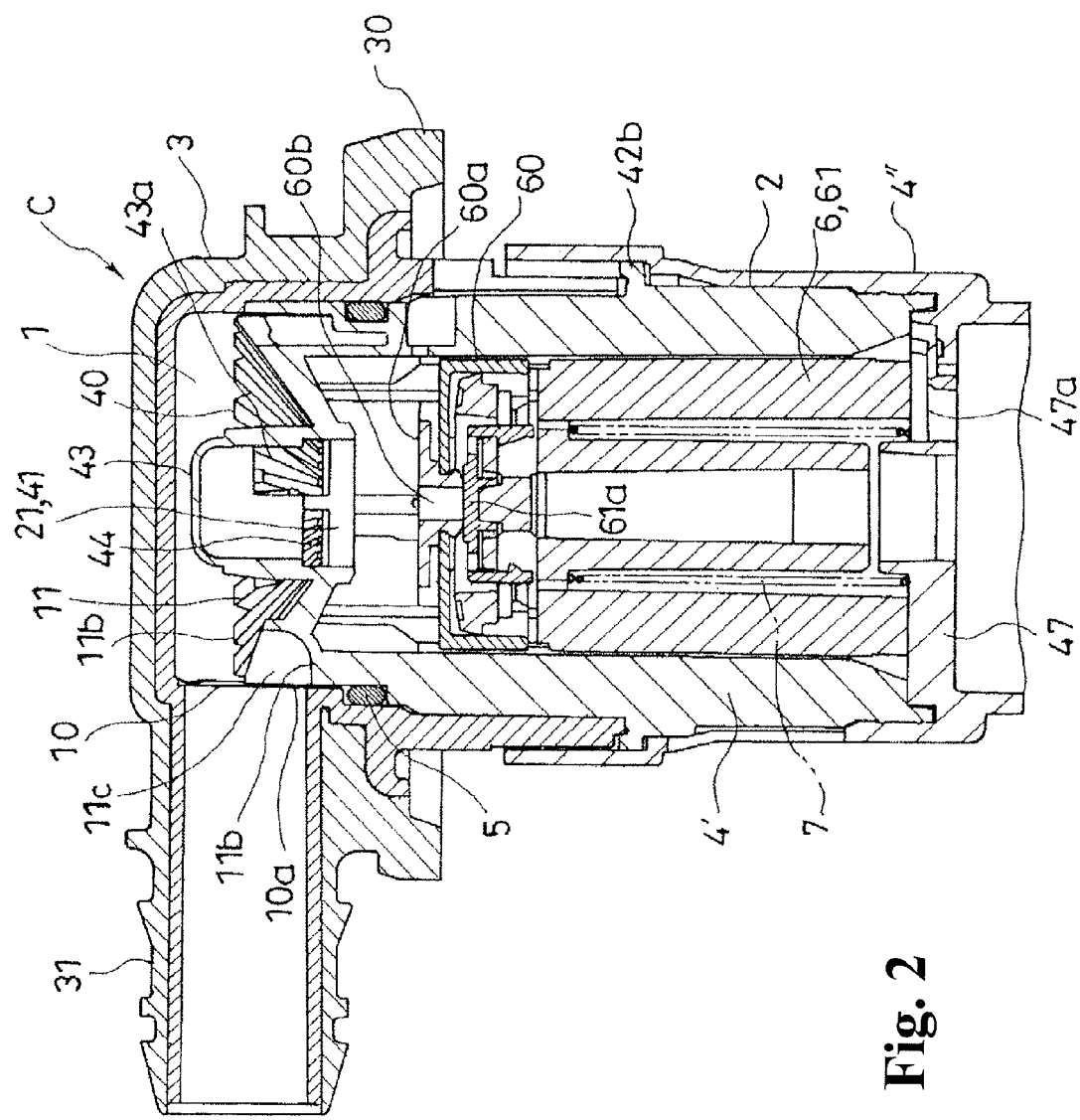
FIG. 2 is a cross-sectional view of an upper portion of the connector.
Figure 3:
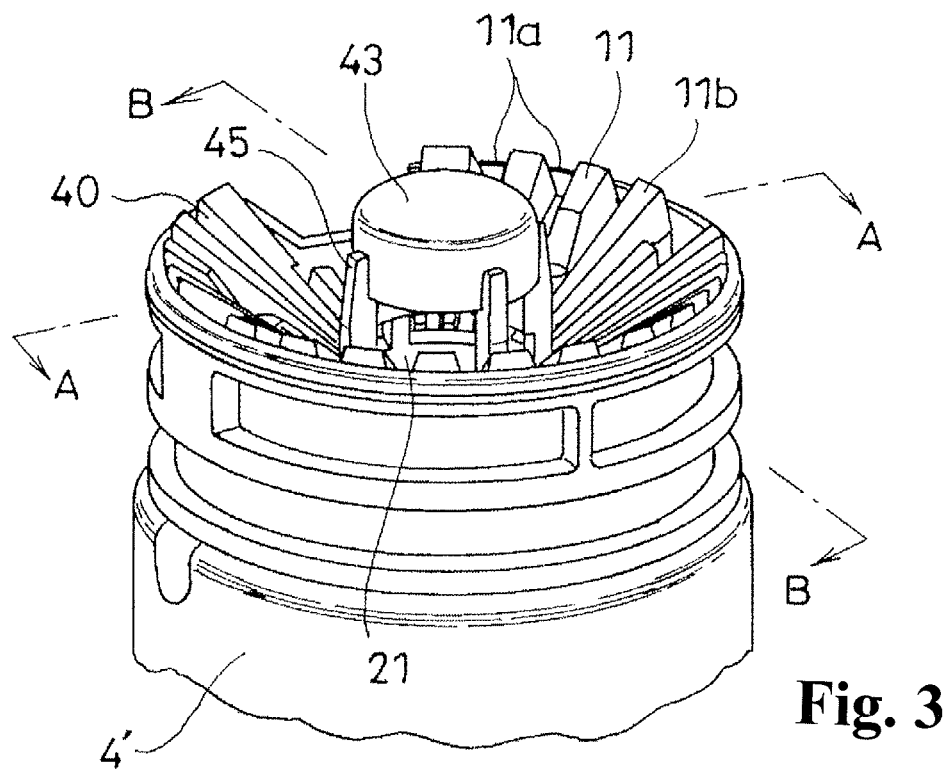
FIG. 3 is a perspective view of an upper portion of an upper case forming the connector.
Figure 4:
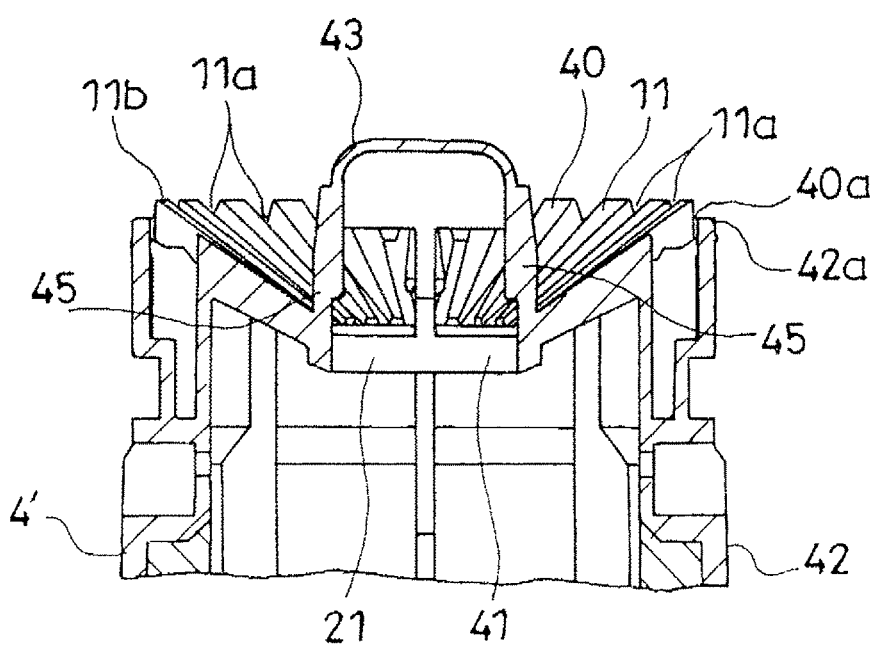
FIG. 4 is a cross-sectional view taken along a line A-A position in FIG. 3.
Figure 5:
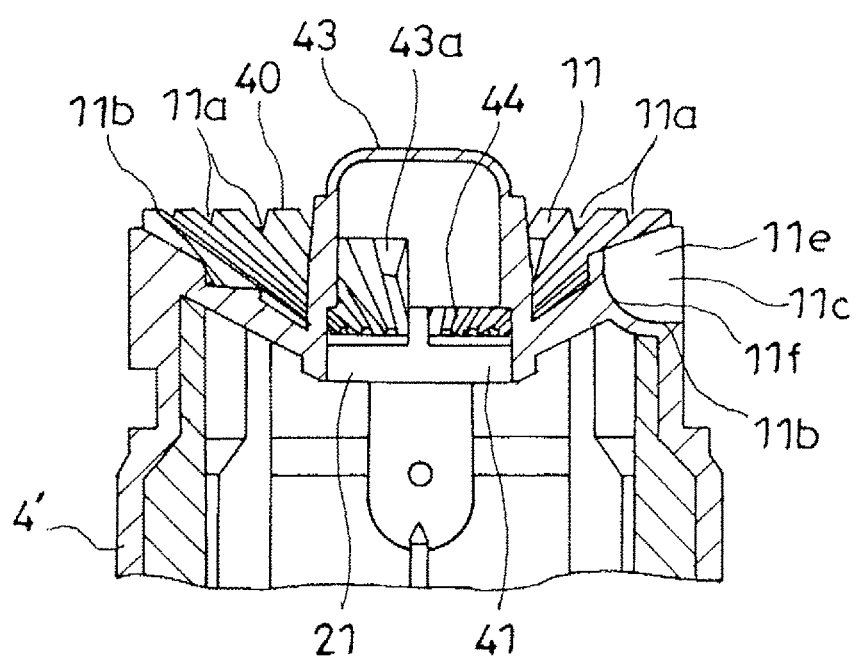
FIG. 5 is a cross-sectional view taken along a line B-B position in FIG. 3.

Hereinafter, based on FIG. 1 to FIG. 5, a typical embodiment of the present invention will be explained. A connector C for a fuel tank according to the embodiment is attached to a fuel tank T of an automobile, a two-wheeled automobile, and the like, and is used for connecting a ventilation flow passage P of the fuel tank T to the fuel tank T.

Such connector C includes an upper chamber 1 provided with a first communication portion 10 relative to the ventilation flow passage P; and a lower chamber 2 provided with a second communication portion 20 relative to the fuel tank T and a third communication portion 21 relative to the upper chamber 1.

In an illustrated example, the connector C is formed by combining a main body 3 with a case 4.

The main body 3 has a short cylindrical shape whose cylinder upper end is closed and whose cylinder lower end is open. In a position of approximately a middle in an up-and-down direction of the main body 3, there is formed an outer flange 30. Also, in a lateral portion of the main body 3 positioned between the aforementioned cylinder upper end and the outer flange 30, there is provided a tube body 31 integrally connecting one tube end to the lateral portion, and protruding in a direction perpendicular to a center axis of the main body 3 from the lateral portion. The tube body 31 communicates with an inside of the main body 3 at one tube end, and opens the other tube end. In the illustrated example, a communication portion between the tube body 31 and the main body 3 functions as the aforementioned first communication portion 10. In the illustrated example, by connecting a tube forming the aforementioned ventilation flow passage P and the like to the tube body 31, the ventilation flow passage P is connected to the fuel tank T through the connector C.

The case 4 is formed by combining an upper case 4' and a lower case 4". Both the upper case 4' and the lower case 4" have a cylindrical shape.

A cylinder lower end of the upper case 4' is open. On the other hand, in a cylinder upper end of the upper case 4', there is formed a top portion 40 provided with a valve orifice 41 functioning as the third communication portion 21 in the center.

In the top portion 40, an outer circumferential portion 40a thereof is integrally connected to an upper edge 42a of a lateral portion 42 of the upper case 4'. Also, the center thereof is positioned below the upper edge 42a of the lateral portion 42, and there is formed the later-described mortar-shaped portion 11 between the outer circumferential portion 40a and the center.

Directly above the valve orifice 41 which becomes the third communication portion 21 in the top portion 40, there is supported a cover body 43. The cover body 43 has a short cylinder shape having an outer diameter approximately equal to an orifice diameter of the valve orifice 41, closes a cylinder upper end, and opens a cylinder lower end. The cover body 43 is supported directly above the valve orifice 41 by leg portions 45 formed to range between the cylinder lower end of the cover body 43 and an orifice edge of the valve orifice 41 in such a way to form a ventilation interval 44 between the cylinder lower end of the cover body 43 and the valve orifice 41. On a side opposed to a side facing the first communication portion 10 in the cover body 43, there is formed a notch portion 43a notching a lateral portion of the cover body 43 from a lower side in a vertical area which becomes approximately a half of an up-and-down dimension of the cover body 43, and in a horizontal area approximately corresponding to a radius of the cover body 43. By the notch portion 43a, the ventilation interval 44 becomes wide on the side opposed to the side facing the first communication portion 10.

In a position which is an outside of the lateral portion 42 of the upper case 4' and is approximately in a middle in an up-and-down direction thereof, there is formed a positioning portion 42b. In the illustrated example, an upper portion of the upper case 4' is fitted into the main body 3 up to a position wherein the cylinder lower end of the main body 3 bumps into the positioning portion 42b of the upper case 4', and both portions are engaged by an engagement device which is not shown in the figures, so that the upper case 4' and the main body 3 are combined. In that combined state, there is formed the aforementioned upper chamber 1 between the top portion 40 of the upper case 4' and the cylinder upper end of the main body 3. The reference numeral 5 shown in the figure represents a seal ring located between the top portion 40 of the upper case 4' and the positioning portion 42b, and sealing between an inner face of the main body 3 and an outer face of the upper case 4'.

The lower case 4" is formed to open both the cylinder upper end and the cylinder lower end. In a position approximately in a middle in an up-and-down direction of the lower case 4", there is formed a dividing wall 47 dividing a space inside the lower case 4" in two up and down. In the dividing wall 47, there is formed a ventilation portion 47a. In the illustrated example, a lower portion of the upper case 4' is fitted into the lower case 4" up to a position wherein the cylinder lower end of the upper case 4' bumps into the dividing wall 47 of the lower case 4", and engagement protrusions represented by the reference numeral 46 in FIG. 1 and formed outside the upper case 4' are entered into and engaged with engagement windows of the lower case 4" represented by the reference numeral 48, so that the lower case 4" and the upper case 4' are combined. In the illustrated example, a space inside the case 4 configured by the lower case 4" and the upper case 4' becomes the aforementioned lower chamber 2, and the cylinder lower end of the lower case 4" functions as the aforementioned second communication portion 20.

In the illustrated example, the case 4 is formed in a size which can be entered into an attachment hole Ta provided in the fuel tank T in a penetration state, and an outer diameter of a formation portion of the outer flange 30 of the main body 3 is formed in a size which cannot be entered into the attachment hole Ta. Then, in a state wherein a lower side from the outer flange 30 has been inserted into the fuel tank T from such attachment hole Ta, the outer flange 30 is welded to an outer face portion of the fuel tank T, so that the connector C is attached to the fuel tank T.

Also, in the embodiment, in the lower chamber 2 of the connector C, there is housed a float body 6 functioning as a valve closing the third communication portion 21 when a fuel in a liquid state flows into the lower chamber 2. In the illustrated example, the float body 6 is housed between the top portion 40 of the upper case 4' and the dividing wall 47 of the lower case 4" in the case 4 movably up and down. In the illustrated example, the float body 6 comprises an upper portion float 60 including a valve body 60a relative to the valve orifice 41; and a lower portion float 61 including a valve body 61a relative to a valve orifice 60b formed in the center of the upper portion float 60. A distance between the valve body 60a of the upper portion float 60 and a lower end of the lower portion float 61 is smaller than a distance between the top portion 40 of the upper case 4' and the dividing wall 47 of the lower case 4", and a gap between an outer face of the float body 6 and an inner face of the upper case 4' is formed. Thereby, in a state wherein the float body 6 has descended, a gas inside the fuel tank T flows into the lower chamber 2 from the second communication portion 20, and through the aforementioned gap, the gas inside the fuel tank T flows into the upper chamber 1 from the third communication portion 21. When a fuel fluid level of the fuel inside the fuel tank T ascends, and the fuel flows into the case 4 through the third communication portion 21, both the lower portion float 61 and the upper portion float 60 ascend, and the valve body of the upper portion float 60 is seated in the valve orifice 41, which becomes the third communication portion 21, so as to block the fuel. When the fuel flows out of the case 4, the lower portion float 61 descends, and the valve body 61a of the lower portion float 61 separates from the valve orifice 60b of the upper portion float 60. Thereby, the upper chamber 1 and the lower chamber 2 are communicated in a range of the valve orifice 60b of the upper portion float 60, and after that, the upper portion float 60 falls, and the upper chamber 1 and the lower chamber 2 are communicated with the third communication portion 21. Also, in the illustrated example, by a compression coil spring 7 disposed between the lower portion float 61 and the dividing wall 47, a given urging force is always acted on the float body 6.

A bottom portion of the upper chamber 1 is formed by the top portion 40 of the upper case 4', and by the top portion 40 of the upper case 4', the bottom portion of the upper chamber 1 becomes the mortar-shaped portion 11 narrowing toward a lower side. Then, in a bottom of the mortar-shaped portion 11, there is formed the third communication portion 21, and in a wall face of the mortar-shaped portion 11, there are formed recesses and protrusions. Namely, in the embodiment, an upper face of the top portion 40 of the upper case 4' is formed to have a mortar shape.

According to the embodiment, even in a case wherein the fuel happens to enter into the upper chamber 1 through the third communication portion 21, while preventing the fuel entered in that manner from moving to a first communication portion 10 side by the aforementioned recesses and protrusions, the fuel can be guided to a lower chamber 2 side through the third communication portion 21 by inclination of the mortar-shaped portion 11 so as to prevent the fuel entered in that manner from entering into the ventilation flow passage P. Typically, at a fueling time, a vehicle inclination time, and the like, when the fuel enters into the lower chamber 2, the fuel blown into the upper chamber 1 together with the gas flowing into the upper chamber 1 through the third communication portion 21 can be prevented from entering into the ventilation flow passage P.

According to the embodiment, the aforementioned recesses and protrusions are formed by a plurality of grooves 11a, 11a . . . formed in the mortar-shaped portion 11. Also, such grooves 11a are formed to range between an upper end 11b of the mortar-shaped portion 11 and the third communication portion 21. More specifically, in the mortar-shaped portion 11, there is formed the plurality of grooves 11a, . . . 11a approximately at an equal interval between adjacent grooves 11a in a direction circling the third communication portion 21. Then, such groove 11a becomes a concave portion, and a space between the adjacent grooves 11a becomes a convex portion. Thereby, in this embodiment, by the groove 11a, the fuel entered into the upper chamber 1 as mentioned above can be appropriately guided to the lower chamber 2 through the third communication portion 21. In a case wherein the vehicle happens to incline as mentioned above, as long as the inclination is in a range of a supposed inclination, it is preferable that the groove 11a has a depth wherein the fuel entered into the mortar-shaped portion 11 does not traverse the groove 11a. Also, it is preferable that the groove 11a is formed to have a cross-sectional shape of widening a groove width as going toward a groove opening from a groove bottom so that the fuel does not remain inside the groove by a surface tension thereof.

Also, in the embodiment, since the cover body 43 is supported directly above the third communication portion 21 in the upper chamber 1, the fuel blown into the upper chamber 1 as mentioned above is blocked, so that the fuel is reliably kept in a formation range of the mortar-shaped portion 11.

Also, in the embodiment, the first communication portion 10 is formed in a lateral portion of the upper chamber 1, and at least one portion thereof is positioned below the upper end 11b of the mortar-shaped portion 11. Specifically, a center axis of the tube body 31, i.e., the center of the first communication portion 10 is approximately positioned at a level of the upper end 11b of the mortar-shaped portion 11. Therewith, in a portion facing the first communication portion 10 in such mortar-shaped portion 11, there is formed a concave portion 11c concaved toward an inside of the mortar-shaped portion 11 and notching one portion of the mortar-shaped portion 11. Namely, such concave portion 11c is open respectively on an upper side and on the first communication portion 10 side. Also, a bottom lid of the concave portion 11c is positioned at the same level of a lower end of the first communication portion 10. Also, a lateral wall 11e and the bottom 11d of the concave portion 11c continue by an R surface 11f. Thereby, in the embodiment, even though the first communication portion 10 is set in the aforementioned level, i.e., even though a whole height of a portion protruded to an outside of the fuel tank T in the connector C is reduced as much as possible, the gas inside the fuel tank T can smoothly move to the ventilation flow passage P through the first communication portion 10.

Incidentally, all contents of the specification, claims, drawings, and abstract of Japanese Patent Application No. 2011-082530 filed on Apr. 4, 2011 are cited in their entireties herein and are incorporated as a disclosure of the specification of the present invention.

What is claimed is:

1. A connector for a fuel tank attached to the fuel tank for connecting a ventilation flow passage thereof to the fuel tank, comprising:
  an upper chamber provided with a first communication portion relative to the ventilation flow passage; and
  a lower chamber provided with a second communication portion relative to the fuel tank, and a third communication portion relative to the upper chamber,
  wherein a mortar-shaped portion narrowing toward a lower side is formed in a bottom portion of the upper chamber, and
  the third communication portion is formed in a bottom of the mortar-shaped portion, and recesses and protrusions are formed in a wall face of the mortar-shaped portion.

2. A connector for a fuel tank according to claim 1, wherein the recesses and protrusions are formed by a plurality of grooves formed in the mortar-shaped portion.

3. A connector for a fuel tank according to claim 2, wherein the groove is formed in a range between an upper end of the mortar-shaped portion and the third communication portion.

4. A connector for a fuel tank according to claim 1, wherein a cover body is supported directly above the third communication portion in the upper chamber.

5. A connector for a fuel tank according to claim 1, wherein the first communication portion is formed in a lateral portion of the upper chamber, and at least one portion thereof is positioned below an upper end of the mortar-shaped portion, and a concave portion concaved toward an inside of the mortar-shaped portion is formed in a portion facing the first communication portion in the mortar-shaped portion.

6. A connector for a fuel tank according to claim 1, wherein the mortar-shaped portion is arranged in the upper chamber such that a center of the upper chamber projects toward the lower chamber.

7. A connector for a fuel tank according to claim 6, wherein the mortar-shaped portion projecting downward toward the lower chamber divides the upper chamber from the lower chamber.

8. A connector for a fuel tank according to claim 6, wherein the recesses and projections are located in the upper chamber.

9. A connector for a fuel tank according to claim 1, further comprising:
- a main body defining the upper chamber,
- a case defining the lower chamber and connected to the main body, and
- a cover body formed separately from the main body and the motor-shaped portion, the cover being supported by the motor-shaped portion and located directly above the third communication portion in the upper chamber.

10. A connector for a fuel tank according to claim 9, wherein the cover body includes a notch portion at a side opposite to the first communication portion.

\* \* \* \* \*